(12) United States Patent
Zubrod

(10) Patent No.: US 8,617,452 B2
(45) Date of Patent: Dec. 31, 2013

(54) METHODS OF MAKING A CONSTRUCTION MATERIAL WITH A VOLTAGE

(75) Inventor: Rodney W. Zubrod, Farmington, NM (US)

(73) Assignee: SRMZ Technical, Inc., Farmington, NM (US)

( * ) Notice: Subject to any disclaimer, the term of this patent is extended or adjusted under 35 U.S.C. 154(b) by 0 days.

(21) Appl. No.: 13/210,024

(22) Filed: Aug. 15, 2011

(65) Prior Publication Data

US 2012/0037043 A1 Feb. 16, 2012

Related U.S. Application Data

(60) Provisional application No. 61/373,567, filed on Aug. 13, 2010.

(51) Int. Cl.
*B29C 67/00* (2006.01)
*B29C 35/12* (2006.01)
*C04B 7/00* (2006.01)
*H05B 6/00* (2006.01)

(52) U.S. Cl.
USPC ........... 264/494; 264/426; 264/430; 264/449; 264/DIG. 46

(58) Field of Classification Search
None
See application file for complete search history.

(56) References Cited

U.S. PATENT DOCUMENTS

| | | | | |
|---|---|---|---|---|
| 2,406,714 A * | 8/1946 | Strickland, Jr. | ................ | 264/449 |
| 3,072,960 A * | 1/1963 | Smythe et al. | ......... | 425/174.8 R |
| 5,223,235 A * | 6/1993 | Wason | ........................ | 423/118.1 |
| 7,071,153 B2 * | 7/2006 | Lewis et al. | .................... | 510/240 |
| 2004/0081827 A1 * | 4/2004 | Datta et al. | .................... | 428/384 |

\* cited by examiner

*Primary Examiner* — Benjamin Schiffman
(74) *Attorney, Agent, or Firm* — Hogan Lovells US LLP

(57) ABSTRACT

Disclosed herein are materials, and methods for creating materials, that does not require heat to create a functional construction material. One purpose of the materials and methods disclosed herein is, at least, to provide industries, such as the construction industry, with a product that significantly reduces the generation of carbon dioxide during production, unlike Portland Cement and typical geopolymer cements. Further, another advantage of the invention is that it utilizes basic processes and materials that may be incorporated into existing production facilities and methodologies. A further purpose is to increase the quality of the product by reducing damage from, for example, exposures to adverse climatic conditions (such as extreme or variable weather), or damaging chemicals such as chlorides, sulfates, acids, or the like.

3 Claims, No Drawings

METHODS OF MAKING A CONSTRUCTION MATERIAL WITH A VOLTAGE

CROSS-REFERENCE TO RELATED APPLICATIONS

This application claims priority to U.S. Provisional Patent Application No. 61/373,567, filed Aug. 13, 2010, which is incorporated herein in its entirety.

BACKGROUND

Geopolymer cement in the prior art has several undesirable properties or undesirable manufacturing steps. For example, a typical geopolymer cement requires an undesirable heating step near the temperature range of 450° C. to 750° C. to calcine the material, prior to mixing with water and aggregate materials. Also, undesirable low levels of heat (approximately 60 to 200° C.) are many times used to enact the polymerization in place of calcining. Similarly undesirable activators are used in the prior art to achieve strength, durability, and/or acceptable shrinkage characteristics. These disadvantages create unnecessary energy consumption, expense, and/or damage to embedded items. For example, chloride ion containing activators such as sodium or calcium chloride have been known to damage embedded items in prior art materials. As another example, Portland Cement requires a significant amount of energy/heat (in excess of 2000° C.) to create clinker prior to the grinding process.

As another example, Portland Cement Concrete requires a significant amount of energy and releases significant amounts of carbon dioxide into the atmosphere during production. To produce the majority of existing geopolymer concretes or geopolymer cements some degree of high heat calcination (e.g. from about 450° C. to about 750° C.) is required, prior to the addition of typical construction aggregate materials or water. Without a calcination heat treatment, prior art geopolymer concrete typically undergoes significant shrinkage during the strength development phase.

Calcining ingredients at a temperature ranging from about 400° C. to about 1200° C. degrees improves the quality of final mixtures, and reduces the caustic nature of alkali ingredients. One aspect of this invention removes this process thereby providing the industry with a concrete material that does not produce the carbon dioxide emissions created by applying a about 400° C. to about 1200° C. degree calcination process without compromising the desired qualities of the material, such as strength, durability, shrinkage, and modulus.

Activators consisting of chloride ion containing materials such as silic acid, or, potassium, calcium, or sodium salts produces strengths and desired quality characteristics. One advantage of the invention is that it does not require activators consisting of chloride ion containing materials and, thus, serves to provide the industry with a zero, or extremely low, chloride containing material without compromising the desired qualities of the material, such as strength, durability shrinkage, and modulus. One advantage of this approach is the reduction of damage caused by chloride ion attack on embedded metallic features in concrete, such as reinforcing steel. Of course, the materials and methods disclosed herein will still function with the use of these, and other, activators but it does not require them.

Oxidizing certain ingredients, and/or forming hardened materials under low heat consisting of from about 60° C. to about 200° C. degrees and then reducing these materials in size, produces desired quality characteristics in a construction material. One aspect of this invention provides the industry with a simplified production methodology, useable, for example, by the majority of new or current Ready Mix Concrete Suppliers.

Utilizing specific forms of Class C fly ash or Stainless Steel Ground Slag is appropriate to achieve desired quality characteristics in a construction material. This invention will function with these or similar materials. In addition, one aspect of this invention is that these materials are not required and, thus, the invention provides for use of a broader range of types of fly ash and Ground Blast Furnace Slag.

Calcined Kaolin Clay is appropriate for use in some construction materials. This invention will function with this and similar materials. In addition, one aspect of this invention is that it also utilizes non-calcined Kaolin Clay thereby further reducing Carbon Dioxide emissions by removing a substantial portion, or all, of the calcining process used with calcined Kaolin Clay. For example, one replacement for calcined Kaolin Clay or non-calcined Kaolin Clay, contemplated by the invention, is Purified Attapulgite Clay added at extremely low dosages of from 0.05% to 5% of the cementitious portion. Other similar materials can also be substituted for calcinated Kaolin Clay.

SUMMARY

One aspect of the methods and materials disclosed herein provides for normal weight concrete mixtures that may be field or plant cast for normal and pre-cast operations, respectively. A further aspect of the disclosed methods and materials presents options for ambient curing methodology, novel electrical charge curing/strength gain, or low-heat curing/strength gain. This disclosure also presents ultra-lightweight applications for pre-cast or field operations incorporating voiding apparatus from, for example, calcium hydroxide and activated alumina, synthetic or protein based foaming materials, or other similar materials. Further, the materials and methods disclosed herein are also capable of specifically controlling the characteristics of set time and shrinkage with the addition and sequencing of novel materials, along with targeting and controlling all other characteristics including modulus, strength, and durability.

Also disclosed herein are methods and materials for mixing individual dry or wet components without the need for calcining and/or grinding as part of cementitious material development, or applying heat after mixing, that when combined, produce a cementitious mixture that complies with strength, modulus, shrinkage, and/or durability requirements presented in various construction codes in various regions of the United States and abroad.

Disclosed herein is a geopolymer concrete that does not require calcination, nor does it undergo significant shrinkage during the strength development phase, thereby reducing carbon dioxide emissions to a minimum. Also disclosed is a voltage cure method that increases production efficiency significantly. Further disclosed is an ultra-lightweight material that is currently unprecedented in the geopolymer cement/concrete science which, due to its void content, is also an excellent source of thermal insulating material.

One aspect of the invention involves installing, for example, activated alumina combined with calcium hydroxide, foaming materials derived from synthetic or protein based foams in the construction material. This leads to certain advantages, such as reduced weight for geotechnical engineering and transport purposes and increasing the insulating R values. Further, we are aware of no prior art utilizing an AC or DC electrical charge curing methodology as described herein.

One of the approaches disclosed herein utilizes liquid an/or dry alkaline materials that may react with materials such as silica, pozzolan, and/or alumino silica components to create a cementitious mass. In one embodiment, typical set times vary from about 15 minutes to about 2 hours depending upon, at least, material sequencing, the local material mixture components, and/or the design desired set time, any of which may be operator selected.

Under one approach, dry materials may be deposited into conventional Ready-Mix concrete delivery vehicles at the batch plant where water is added. On the other hand, water may be added in the field depending upon the set characteristics of the mixture. Liquid materials may be mixed, for example, 24 hours in advance of batching operations, then deposited into conventional Ready-Mix concrete delivery vehicles along with aggregates and other constituents. Mixtures may also be designed for volumetric batching apparatus. Also, the invention contemplates using an apparatus that mixes for a minimum of 10 minutes prior to final material placement in the construction feature. In addition, wet mix batch plants can be a suitable replacement for Ready-Mix or volumetric delivery apparatus.

Under one approach for liquid alkaline materials, a sodium silicate solution consisting of sodium hydroxide (NaOH) and silica ($SiO_2$), may be combined with sodium hydroxide (NaOH) at a ratio of from about 50:50 to about 100:00 (sodium silicate:sodium hydroxide). This ratio may be dependent upon other material characteristics. Potassium Hydroxide and Potassium Silicate may be used, but due to their high expense may not, necessarily, be the chosen alkali or silica source. The amount of available alumino silicate, fly ash quality (power plant burner efficiency) and type (Class C or Class F), pozzolan materials, and strength requirements may influence the operators/designers concentration of $SiO_2$. Likewise, the concentration ratio of sodium silicate and sodium hydroxide may vary, but, in one embodiment, a ratio of 75:25 (sodium silicate to sodium hydroxide) may be typically effective. Combined mixtures with substantial alumino silicate contents in excess of 50-percent may require reduced silica content.

For dry alkaline materials, a sodium metasilicate or sodium metasilicate penehydrate may be used an either may contain a $SiO_2$ content of from about 40% to about 70%. If, for example, an optimal blend of $SiO_2$ and alkalinity cannot be purchased from a commercial source, the sodium metasilicate or sodium metasilicate penehydrate alkalinity or $SiO_2$ content may be adjusted without compromising performance of the material. For example, one or more of the following materials may be used: dry or liquid sodium hydroxide, zeolites, diatomite, ground silica stone, sodium citrate dihydrate, orthosilicic acid, water, water reducing admixtures, calcium, sodium carboxylmethlycellulose, calcium carboxylmethlycellulose, and/or some combination. For example, from approximately 0.01 to approximately 2-percent of sodium carboxylmethlycellulose or calcium carboxylmethlycellulose may be used. Use of materials such as these may lead to control over, for example, the pH, strength, set time, and/or shrinkage characteristics, as defined by the amount of calcium hydroxide and alumino silicates present in other constituent materials.

DETAILED DESCRIPTION

The following, non-limiting, examples further illustrate embodiments of the materials and methods disclosed herein.

EXAMPLE 1

Calcined Kaolin Clay—100 lbs/cubic yard
Class F Fly Ash—550 lbs/cubic yard
Cliniptolite Zeolites (from 1 to 9 microns)—10 lbs/cubic yard
Water—227.5 lbs/cubic yard
Calcium Hydroxide—5 lbs/cubic yard
Activated Alumina—0.81 lbs/cubic yard
Sodium Metasilicate—113.8 lbs/cubic yard
Micro Fibers—2.0 lbs/cubic yard
Macro Fibers—1.5 lbs/cubic yard Representative Approximate Properties for One Embodiment of Example 1

4-hour oven cure at 170 Fahrenheit—950 psi compressive strength.
8-hour oven cure at 170 Fahrenheit—1,300 psi compressive strength.
8-hour oven cure at 170 Fahrenheit Flexural Modulus—110 psi.
7-day ambient cure—40 psi.
28-day ambient cure—110 psi.
Void content created from hydrogen production—62-percent.

Example 1

All components, except for the activated alumina, were deposited into a mixer and the combination was mixed for 10 minutes. Following this 10-minute initial mix period, the activated alumina was included and the mixture was further mixed for 60 seconds. The mixture was immediately deposited into test cylinders and flexural strength molds. All specimens were placed in a 170 degree Fahrenheit oven and cured for 4 and then 8 hours.

Micro and macro fibers may be added to the mixture to decrease the elastic modulus, increase the Poisson's ratio value, and/or increase the flexural modulus. For example, these fibers may be added after the initial ingredient mixing to avoid clumping. However these fibers are not required and may be used or left out depending upon the intended application. The mixture developed herein may be used, for example, with thin sections, or applications where the feature constructed may have a thickness to length ratio of greater then about 1:4, or other similar ratio. Voids created from hydrogen production utilizing activated alumina and calcium hydroxide may be replaced by adding protein or synthetic foam up to volumes of about 0 to about 90-percent of the total mass. The voids of this example can be used with the invention in general, such as the other example mixtures disclosed herein, and are not limited to this example.

EXAMPLE 2

Calcined Kaolin Clay—125 lbs/cubic yard
Hydrous Kaolin Clay—125 lbs/cubic yard
Class F Fly Ash—550 lbs/cubic yard
ASTM C33 Concrete Sand—2,411 lbs/cubic yard
Water—360 lbs/cubic yard
Sodium Metasilicate Penehydrate—150 lbs/cubic yard Calcium carboxylmethlycellulose or Sodium carboxylmethylcellullose—5 lbs/cubic yard (from 0.01 to approximately 2-percent, for example.)
Diatomite—15 lbs/cubic yard
High range surfactant water reducer—95 ounces/cubic yard
Calcium Hydroxide—35 lbs/cubic yard
Purified attapulgite clay—1.2 lbs/cubic yard Representative Approximate Properties of one Embodiment of Example 2.

Plastic pH—13.1
1-Day Compressive Strength 1,630 psi
3-Day Compressive Strength 2,100 psi
7-Day Compressive Strength 3,330 psi
28-Day Compressive Strength 4,320 psi
28-Day shrinkage 0.016-percent
28-Day Young's Modulus 3.78.
28-Day Poisson's ratio 0.221
6-hour oven cure compressive strength at 170 Fahrenheit (tested at 24 hours)—7,340 psi
2.0 hour laboratory cure to initial set, then 40 amps AC Voltage for 60 seconds
Tested @ 24 hours—4,950 psi Example 2

In a sequenced approach, all dry components, except for Calcium Hydroxide, were deposited into a mixer, water was added and the combination was mixed for 15 minutes. Following the 15-minute initial mix period, the water reducing chemical and the calcium hydroxide were included and the mixture was further mixed for 5 minutes, then test specimens were fabricated.

In non-sequenced approach, all ingredients may be included in the initial mix. With this approach, strength and modulus properties are similar to the sequenced batch, however the rheological texture qualities may be reduced and shrinkage characteristics may be elevated compared to the sequenced material. One embodiment of the non-sequenced batch resulted in a 28-day shrinkage measurement of 0.033%. AC Voltage was passed through both the sequenced and non-sequenced cylindrical specimens by attaching the electrical ground wire to a flat metal plate beneath the specimen, and the positive charge to a cylindrical plate situated on the surface of the specimen. A charge was applied until the specimen achieved a 190 degree Fahrenheit surface temperature at which point the treatment was terminated. The shrinkage test included a 28-day final measurement and an initial comparatory measurement at 7 days; the test environment included the constant water cure method. One specific test procedure includes a water soak of the test bar for 7 days after initial mixing, then a length measurement occurs and the specimen is returned to the water bath for another 21 days where the final length measurement occurs and is compared to the 7 day reading to determine % shrinkage. The comparatory measurement can be used for each individual shrinkage test bar including the test bars for the sequenced and non-sequenced batch.

EXAMPLE 3

Calcined Kaolin Clay—250 lbs/cubic yard
Class F Fly Ash—550 lbs/cubic yard
ASTM C33 Concrete Sand—2,653 lbs/cubic yard
Water—320 lbs/cubic yard
Sodium Metasilicate Peneahydrate—140 lbs/cubic yard
Calcium carboxylmethlycellulose or Sodium carboxylmethylcellullose—3 lbs/cubic yard
Cliniptolite Zeolites (from 1 to 9 microns)—20 lbs/cubic yard
Calcium Hydroxide—30 lbs/cubic yard
High range surfactant water reducer—95 ounces/cubic yard
Purified attapulgite clay—1.1 lbs/cubic yard
Orthosilicic Acid or related Silicic Acid—2 lbs/cubic yard Representative Approximate Properties of one Embodiment of Example 3

Plastic pH—12.7
1-Day Compressive Strength 2,200 psi
3 Day Compressive Strength 4,100 psi
7 Day Compressive Strength 5,880 psi
28-Day Compressive Strength 6,850 psi
28-Day shrinkage 0.022-percent
28-Day Young's Modulus 4.52
28-Day Poisson's ratio 0.18
6-hour oven cure compressive strength at 170 Fahrenheit (tested at 24 hours)—8,460
1.5 hour laboratory cure to initial set, then 40 amps AC Voltage for 60 seconds
Tested @ 24 hours—5,890 psi Example 3

In a sequenced approach, all dry components, except for Calcium Hydroxide, were deposited into a mixer, water was added and the combination was mixed for about 15 minutes. Following the 15-minute initial mix period, the water reducing chemical and the calcium hydroxide were included and further mixed for 5 minutes, then test specimens were fabricated.

In another non-sequenced approach, all ingredients may be included in the initial mix. With this approach, strength and modulus properties are similar to the sequenced batch, however the rheological texture qualities may be reduced and shrinkage characteristics may be elevated compared to the sequenced material. One embodiment of the non-sequenced batch resulted in a 28-day shrinkage measurement of 0.038-percent. An AC Voltage was passed through both the sequenced and non-sequenced batches by attaching the electrical ground wire to a flat metal plate beneath the specimen, and the positive charge to a cylindrical plate situated on the surface of the specimen. The charge was applied until the specimen achieved a 190 degree Fahrenheit surface temperature at which point the treatment was terminated. The shrinkage test included a 28-day final measurement after an initial comparatory measurement at 7 days; the test environment included the constant water cure method.

EXAMPLE 4

Calcined Kaolin Clay—125 lbs/cubic yard
Hydrous Kaolin Clay—125 lbs/cubic yard
Class F Fly Ash—550 lbs/cubic yard
ASTM C33 Concrete Sand—2,411 lbs/cubic yard
Water—380 lbs/cubic yard
Sodium Metasilicate Penehydrate—160 lbs/cubic yard
Calcium carboxylmethlycellulose or Sodium carboxylmethylcellullose—5 lbs/cubic yard
Diatomite—15 lbs/cubic yard
High range surfactant water reducer—95 ounces/cubic yard
Calcium Hydroxide—35 lbs/cubic yard
Purified attapulgite clay—1.2 lbs/cubic yard
Magnesium Sulfate—4.4 lbs/cubic yard Representative Approximate Properties of One
Embodiment of Example 4

Plastic pH—12.6
1-Day Compressive Strength 920 psi
3-Day Compressive Strength 1,400 psi
7-Day Compressive Strength 2,420 psi
28-Day Compressive Strength 3,440 psi
28-Day shrinkage 0.001-percent
28-Day Young's Modulus 3.29
28-Day Poisson's ratio 0.233
6-hour oven cure compressive strength at 170 Fahrenheit (tested at 24 hours)—6,480 psi
2.5 hour laboratory cure to initial set, then 40 amps AC Voltage for 60 seconds
Tested @ 24 hours—4,160 psi Example 4

In one embodiment, all dry components, except for Calcium Hydroxide and Magnesium Sulfate, were deposited into a mixer, water was added and the combination was mixed for about 15 minutes. Following the 15-minute initial mix period, the water reducing chemical, the calcium hydroxide, and the magnesium sulfate were included and further mixed for about 5 minutes, then test specimens were fabricated. An AC or DC Voltage may be passed through the cylindrical specimens by attaching the electrical ground wire to a flat metal plate beneath the specimen, and the positive charge to a cylindrical plate situated on the surface of the specimen. The charge was applied until the specimen achieved a 190 degree Fahrenheit surface temperature at which point the treatment was terminated. The shrinkage test included a 28-day final measurement after an initial comparatory measurement at 7 days; the test environment included the constant water cure method.

EXAMPLE 5

Class F Fly Ash—700 lbs/cubic yard
ASTM C33 Concrete Sand—2,482 lbs/cubic yard
Water—330 lbs/cubic yard
Sodium Metasilicate Penehydrate—160 lbs/cubic yard
Diatomite—28 lbs/cubic yard
High range surfactant water reducer—77 ounces/cubic yard
Calcium Hydroxide—35 lbs/cubic yard
Purified attapulgite clay—1.4 lbs/cubic yard Representative Approximate Properties of One
Embodiment of Example 5

Plastic pH—13.6
1-Day Compressive Strength 1,260 psi
3-Day Compressive Strength 2,460 psi
7-Day Compressive Strength 3,870 psi
28-Day Compressive Strength 5,910 psi
28-Day shrinkage 0.044-percent
28-Day Young's Modulus 4.22
28-Day Poisson's ratio 0.182
6-hour oven cure compressive strength at 170 Fahrenheit (tested at 24 hours)—8,330 psi
2.5 hour laboratory cure to initial set, then 40 amps AC Voltage for 60 seconds
Tested @ 24 hours—5,760 psi Example 5

In one embodiment, all dry components were deposited into a mixer, water was added and the combination was mixed for about 5 minutes. Following the 5-minute initial mix period, a water reducing chemical was included and the mixture was further mixed for about 10 minutes, then test specimens were fabricated. An AC Voltage was passed through the cylindrical specimens by attaching the electrical ground wire to a flat metal plate beneath the specimen, and the positive charge to a cylindrical plate situated on the surface of the specimen. The charge was applied until the specimen achieved a 190 degree Fahrenheit surface temperature at which point the treatment was terminated. The shrinkage test included a 28-day final measurement after an initial comparatory measurement at 7 days; the test environment included the constant water cure method.

The primary polymerization effect is the development of synthetic zeolites created through the reaction between the sodium hydroxide, sodium silicate, and a pozzolan material. A method disclosed herein to build mixture zeolites invludes mixing Class F fly ash with a relatively weak molar solution (from about 3 to about 8 molar) of sodium hydroxide. The mixture may then be transferred to a heat source ranging between 160 and 180 degrees Fahrenheit, and allowed to cure for a minimum of about 12 hours. In one embodiment, the heat source may include a high moisture concentration to enhance strength, but this is not required. The hardened mixture may then be pulverized to about a 100-percent passing of a sieve, such as a #325 sieve or similar. The pulverized mixture may be combined with various types and dosages of the materials disclosed herein. The resulting material is characterized by, for example, excellent durability, set time, shrinkage, modulus, and/or strength characteristics. As with the other materials and methods disclosed herein, the design operator may adjust the type and/or dosage of the disclosed constituents to achieve desired durability, set time, shrinkage, modulus, and/or strength characteristics among other properties.

An additional disclosed, novel method of preparing liquid material mixtures involves combining the desired ratio of liquid sodium silicate and liquid sodium hydroxide and allowing the mixture to normalize for a minimum of about 16 hours. The sodium hydroxide and sodium silicate combination may then be mixed with low calcium content Class F fly ash and stored in a liquid state for up to, at least, 4 days prior to incorporation into geopolymer concrete mixtures. The combined material may be required to be mixed every 15 minutes, and occasional additions of sodium hydroxide, sodium silicate, or a combination thereof, may, under certain circumstances, be necessary to maintain the viscosity of the material. The thick solution may then be combined with materials described herein. The resulting materials will be characterized by, for example, excellent durability, modulus, shrinkage, and/or strength characteristics. The design operator may adjust the type and dosage of constituents to achieve, at least, desired durability, set time, shrinkage, modulus, and/or strength characteristics, among other properties With respect to any method or material disclosed herein, in the event that desired shrinkage characteristics are not readily achievable using local materials, small amounts of materials such as magnesium (which may be preferable), calcium, potassium sulfate, sodium fluoride, calcium fluoride, and/or a combination thereof may be included at dosage rates of from about 0.1% to 2% or higher. The amount of these materials added may be adjusted for maximum strength and durability results when controlling shrinkage. The addition of Portland Cement is also an option relative to the reduction in shrinkage thereby building expansive ettringite in the material. If Portland Cement is used, surfactant high-range water reducers may be utilized to reduce shrinkage characteristics, many times without the induction of a swell by sulfate materials. Further, surfactant water reducers may also be an effective consistency and strength enhancer when Portland Cement is not used.

The invention claimed is:

1. A method of making a material comprising sodium metasilicate with a $SiO_2$ content of from about 40 to about 70 percent; sodium hydroxide with a concentration of from about 10 Molar to about 14 Molar; sodium silicate with a $SiO_2$ content of from about 40 to about 70 percent; alumino silicate; and one or more of calcium oxide or calcium hydroxide, the method comprising; mixing the desired ingredients; curing the mixture by applying one or more of a AC or DC voltage; wherein the material complies with strength, modulus, shrinkage, and durability requirements of a construction material without the need for calcining, grinding, applying heat after mixing, or adding activators.

2. The method of claim 1, wherein the voltage is passed through the material by attaching an the electrical ground wire to a flat metal plate beneath the material and attaching a the positive charge to a cylindrical plate situated on the surface of the material.

3. The method of claim 1, wherein the electrical voltage charge is applied until the material specimen achieves about a 190 degree Fahrenheit surface temperature.

* * * * *